US008315724B2

(12) United States Patent
Rice, Jr.

(10) Patent No.: US 8,315,724 B2
(45) Date of Patent: Nov. 20, 2012

(54) WIRELESS AUDIO STREAMING TRANSPORT SYSTEM

(75) Inventor: Larry D. Rice, Jr., Simi Valley, CA (US)

(73) Assignee: Minebea Co. Ltd. (JP)

( * ) Notice: Subject to any disclaimer, the term of this patent is extended or adjusted under 35 U.S.C. 154(b) by 1555 days.

(21) Appl. No.: 11/750,009

(22) Filed: May 17, 2007

(65) Prior Publication Data

US 2008/0175395 A1 Jul. 24, 2008

Related U.S. Application Data

(60) Provisional application No. 60/881,782, filed on Jan. 19, 2007, provisional application No. 60/885,624, filed on Jan. 18, 2007.

(51) Int. Cl.
*G06F 17/00* (2006.01)
*H04H 40/00* (2008.01)
*H04J 3/02* (2006.01)

(52) U.S. Cl. .......................... 700/94; 455/3.06; 370/537

(58) Field of Classification Search .................... 700/94; 455/3.06, 899; 370/498, 537, 205, 212; 375/340, 375/342, 238; 329/312; 379/101.01
See application file for complete search history.

(56) References Cited

U.S. PATENT DOCUMENTS 3,995,120 A * 11/1976 Pachynski, Jr. ............... 370/517
4,310,922 A * 1/1982 Lichtenberger et al. ...... 370/306
4,497,068 A * 1/1985 Fischer ......................... 398/191
6,590,982 B1 7/2003 Chen
7,333,478 B2 * 2/2008 Wiebe ........................... 370/352
2003/0128702 A1 * 7/2003 Satoh et al. ................... 370/390
2005/0058114 A1 * 3/2005 Santhoff et al. ............... 370/343
2005/0289224 A1 * 12/2005 Deslippe et al. .............. 709/208
2007/0213083 A1 * 9/2007 Shaanan ....................... 455/500

FOREIGN PATENT DOCUMENTS

JP 2004336252 11/2004
KR 20020080153 10/2002
KR 20030021986 3/2003
KR 20040076983 9/2004
KR 20040097506 11/2004
WO WO 97/29550 8/1997
WO WO 99/23856 5/1999

* cited by examiner

*Primary Examiner* — Davetta W Goins
*Assistant Examiner* — Daniel Sellers
(74) *Attorney, Agent, or Firm* — Fountainhead Law Group P.C.

(57) ABSTRACT

A sound reproduction and amplification system includes a digital central controller, a wireless transmitter and a plurality of addressable wireless digital receivers and digital amplifiers for driving loudspeakers or earphones, wherein Differential Pulse Width Modulation (DPWM) signals from the central control of the audio transmitter are sent to the addressable receivers, but no DPWM signals are sent unless there are changes in the target PWM signals. The control signaling is based on position mapping in each repetitive sequence of bits (i.e., each frame or word) in a digital communication channel, where only a single bit per channel per word is allotted to each receiver/amplifier/loudspeaker. If there is any change in output of any transmitter PWM from the audio processor (decoder), all the channel bits are sent to all the addressable loudspeakers.

20 Claims, 7 Drawing Sheets

| Speaker #1 | Speaker #2 | Speaker #3 | Speaker #4 | Speaker #5 | Speaker #6 | Speaker #7 | Speaker #8 |
|---|---|---|---|---|---|---|---|
| Bit 1 (LSB) | Bit 2 | Bit 3 | Bit 4 | Bit 5 | Bit 6 | Bit 7 | Bit 8 (MSB) |

| | | | | | | | |
|---|---|---|---|---|---|---|---|
| Speaker #1 | Speaker #2 | Speaker #3 | Speaker #4 | Speaker #5 | Speaker #6 | Speaker #7 | Speaker #8 |
| Bit 1 (LSB) | Bit 2 | Bit 3 | Bit 4 | Bit 5 | Bit 6 | Bit 7 | Bit 8 (MSB) |

FIGURE 7

WIRELESS AUDIO STREAMING TRANSPORT SYSTEM

CROSS-REFERENCES TO RELATED APPLICATIONS

The present application claims benefit under 35 USC 119 (e) of U.S. provisional Application No. 60/881,782 filed on Jan. 19, 2007, entitled Wireless Audio Streaming Transport System and U.S. provisional Application No. 60/885,624 filed on Jan. 18, 2007, entitled Wireless Audio Streaming Transport System, the contents of which are incorporated herein by reference in their entirety.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This patent application relates to the streaming of audio data in audio systems. In particularly, this invention relates to audio sound reproduction using addressable loudspeakers from as few as one to a typical number of eight loudspeakers and up to 128 addressable loudspeakers, all of which are disposed to provide an effect of sound surrounding the listener. Depending upon the embodiment, a larger number of audio speakers can also be used.

In order to understand the current invention, it is helpful to understand the manner in which a conductor conducts a band. A transmitter, or audio server, is analogous to a band conductor. The receivers, or speakers, are analogous to the band members. All the band members are always watching the conductor. They follow exactly what the conductor does. When the conductor has the baton in his hand and is moving it, the music is playing. If the conductor speeds up his rhythm, the band will also speed up. If the conductor slows down, the band will slow down. If the conductor should stop for any reason, the music will stop. The band members are very disciplined and only do what the conductor tells them to do. They are completely dependent upon the conductor and only take orders from the conductor.

The following patents relate generally to wireless audio speaker systems.

PCT Publication WO 97/29550 describes a wireless speaker system using a digital receiver/controller for controlling audio transducing equipment.

PCT Publication WO 99/23856 describes a home remote wireless speaker system as for earphone applications and which employs analog to digital and digital to analog conversion.

U.S. Pat. No. 6,590,982 describes a specific type of wireless transmitter with an infrared analog wireless stereo speaker system in a surround sound environment using either wireless stereo speakers or stereo earphones, as well as wired speakers.

Japanese Publication JP2004336252 and Korean Publications KR20020080153, KR20030021986, KR20040076983, and KR20040097506 describe various wireless speaker arrangements.

SUMMARY OF THE INVENTION

According to the invention, a sound reproduction and amplification system includes a digital central controller, a wireless transmitter and a plurality of addressable wireless digital receivers and digital amplifiers for driving loudspeakers or earphones, wherein Differential Pulse Width Modulation (DPWM) signals from the central control of the audio transmitter are sent to the addressable receivers, but no DPWM signals are sent unless there are changes in the target PWM signals. The control signaling is based on position mapping in each repetitive sequence of bits (i.e., each frame or word) in a digital communication channel, where only a single bit per channel per word is allotted to each receiver/amplifier/loudspeaker. If there is any change in output of any transmitter PWM from the audio processor (decoder), all the channel bits are sent to all the addressable loudspeakers. For example, in a 7.1 SS (Surround Sound) system, all 8 bits would be sent—not just one—for the seven distributed speakers plus one bass woofer. Depending upon the embodiment, a larger number of audio speakers can also be used.

Upon initial setup, each speaker is made addressable by assigning it a certain bit in the bit stream, and only looks at its own bit. For example, speaker #3 would be assigned bit #3, and in a 7.1 SS system, when 8 bits are sent, speaker #3 only looks at bit #3. All other bits are ignored. The bit that is assigned to each speaker is part of the initial set-up and can be performed wirelessly.

In operation, when the RF IC associated with a particular receiver/amplifier/speaker receives a packet of eight (8) audio data bits, it simply finds its own bit and outputs its bit to the output port immediately. The output port is connected to the input of a suitable amplifier, preferably a Class-D amplifier. This signal is connected to a transducer (driver), which then creates sound. The foregoing is assuming 8 speakers in the system, as for type 7.1 SS systems. However, the number of receivers is not in theory limited, although as a practical matter, any number of speakers may be in the system, from 1 to 128. This enables operation under monophonic, stereophonic, binaural, 2.1SS, 5.1SS, 7.1SS, etc. systems.

A number of advantages characterize the invention.

- It enables high-quality wireless sound at a minimum cost.
- An all digital audio stream to the speakers provides high-quality audio.
- It eliminates the need for audio cables in audio systems.
- It eliminates the need for a central power amplifier in the audio system, as power amplifiers are built into the speakers themselves.
- It eliminates the need for a central or table-top A/V receiver in the audio system.
- All receiving units/speakers receive exactly the same audio data at exactly the same time frame.
- All speakers will always be in synchronization with each other, and the master device (audio server) will control the timing of all the speakers.
- The timing for decoding of any bit (inside the speaker) in the audio bit stream is exactly the same for all speaker/receiver amplifiers. It doesn't matter where the bit is in the stream, the time to output the bit is exactly the same, so all speakers are always in sync with each other.
- All speakers (sound stream) can be made to always be in synchronization with the video stream in audio/video systems by exacting preprogrammed delays to the audio in order to compensate for the time required to decode the video relative to the audio.

There is no need for special audio decoding chip inside the speakers.

It is bandwidth and power efficient, since only audio data that changes is sent wirelessly. The transmitter radio need not even be turned on unless there is a data change.

The only cord required is the power cord for the amplifier in the speakers (for non-battery powered speakers).

The speaker amplifiers provide only digital amplification within each speaker—there are no analog stages.

All audio processing done on transmitter side. No need for each speaker to do individual processing. The controller/transmitter can do equalization, crossover, and all control.

A system is readily adapted to any number of receiving elements. One only needs to increase the number of audio bits that are sent to equal the number of speakers in the system. For example, a surround sound system with 16 speakers would send 16 bits of DPWM signals over-the-air, and so on.

Receiving units simply receive data, extract their own bits, and send its own bits out to drivers, so there is less hardware inside the receiving/speaker units, which reduces the cost. The vastly simpler hardware and firmware within each speaker lowers overall systems cost.

PWM signals sent over-the-air are independent of the audio server decode scheme.

Code going into the audio decoder on the audio server is independent of the addressing scheme. It may for example be CD, SACD, DVD-audio, DTS, DTS-HD, Dolby, or anything else. All of these encoding formats will be translated into PWM outputs to be sent over-the-air.

The decoder PWM signals inside the transmitter define the maximum possible rate per channel, of the wireless links. For example, if the decoder output is programmed to be 384 Kbps, this is the maximum over-the-air rate per channel. The average over-the-air data rate, however, will be much lower, since only the PWM changes are sent over-the-air. The average over-the-air rate depends heavily on the type of audio—voice or music—that is played.

The PWM transmit/receive scheme is independent of the wireless technology used. The radio may be Bluetooth, 2.4 GHz, 900 MHz, Cypress Wireless USB, or Ultra Wide Band (UWB), for example. The only requirement is that the data bandwidth of the radio must be greater than the number of channels times the PWM data rate used per channel (Number of channels×PWM data rate). For example, using stereo (2 channels) at a rate of 384 Kbps would require at least (2×384 Kbps)=768 Kbps data rate for the radio.

Differential Pulse Width Modulation (DPWM) RF Encoding itself has certain advantages.

There is no need for translation from PCM to PWM inside the speaker.

The speed of PWM signals to receiving/speakers can be any speed. The receiver circuit can be readily adapted to work for virtually any PWM speed of interest. Normal speed for good audio quality would be 192 Kbps or higher, however.

There are minimal delays in the decoding circuitry since no or very little audio processing is needed.

The PWM signals may be stored directly on storage media, such as a CD, DVD, or a digital media player, so that no audio decoder would be needed at all, thus further simplifying system design.

Ternary states are transparent to the transmitter so they can be generated automatically within each receiver/speaker unit, and so the transmitter never needs to generate any special Ternary codes.

The invention will be better understood from the following detailed description in reference to the accompanying drawings.

BRIEF DESCRIPTION OF THE DRAWINGS

FIG. 7 is a diagram of a frame of digital information that is transmitted and received by an exemplary eight-speaker system according to the invention.

DETAILED DESCRIPTION OF THE INVENTION

According to the invention a wireless audio streaming transport system is provided which redefines the basic architecture of a conventional surround sound audio system. Using Ultra Wide Band Radio (UWB) technology as a basic means of audio transport, the audio system no longer uses table-top components, such as audio players, including CD or DVD players, table-top audio amplifiers and/or Audio/Video (A/V) receivers.

Figure 1:
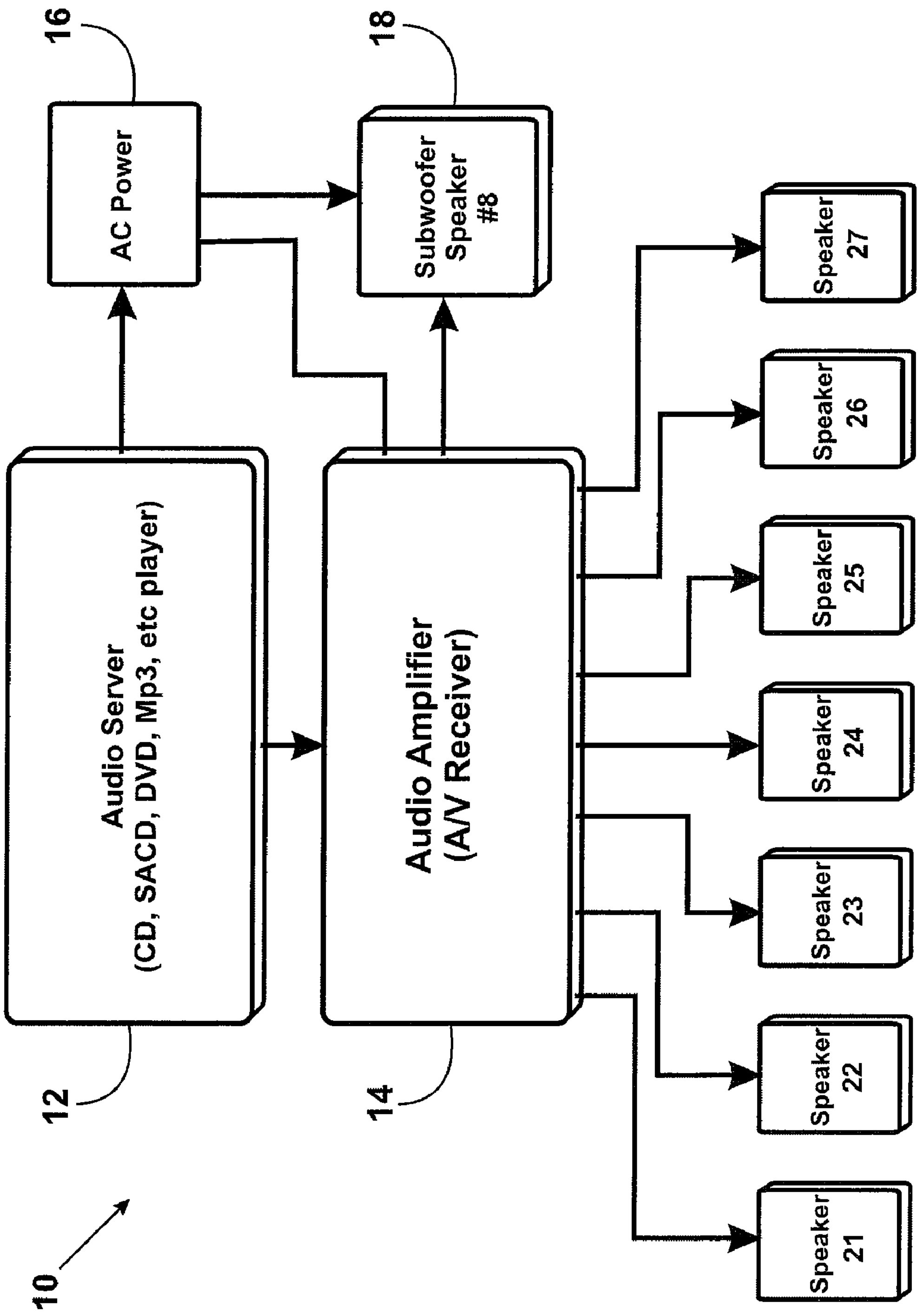
FIGURE 1 (Prior Art)
FIG. 1 is a block diagram of a typical multiple-speaker audio system of the prior art with loudspeakers surrounding the listening space.

FIG. 1 is a block diagram of the typical prior art surround sound audio system 10 with an audio server 12, also conventionally called a preamplifier, coupled to a power amplifier 14. A single power supply 16 services the audio server 12, the audio amplifier 14 and a powered subwoofer speaker 18. The audio amplifier 14 is coupled to and drives passive loudspeakers 21-27 with the various voices programmed for each channel.

Figure 2:
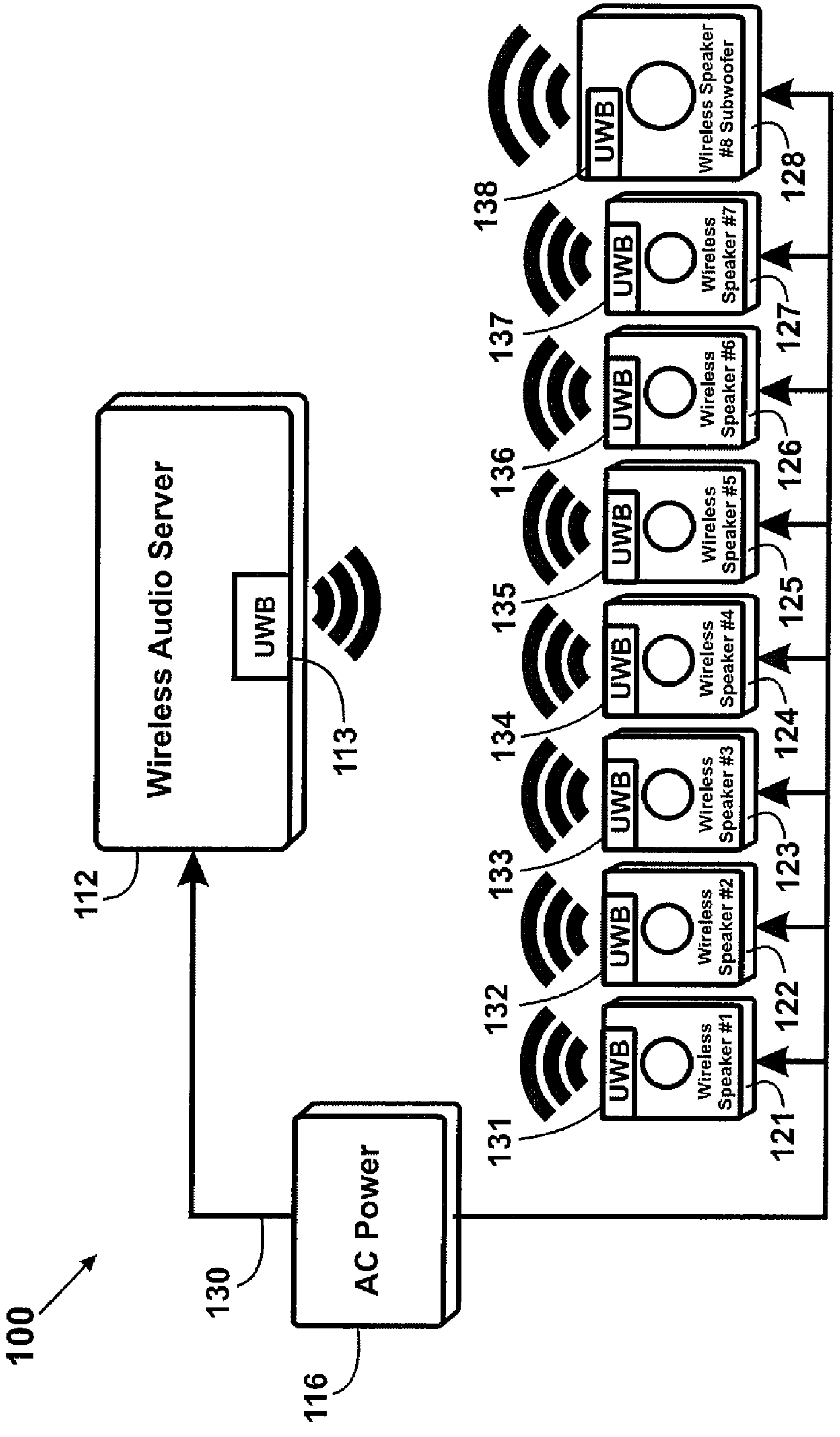
FIG. 2 is a block diagram of a first embodiment of a multiple-speaker audio system according to the invention with loudspeakers surrounding the listening space.

By comparison, FIG. 2 is a block diagram of an audio system 100 of the present invention. The system 100 according to the invention includes a wireless audio server 112 with built-in short-range ultra wide band (UWB) transmitter 113, coupled to receive power from a power line 130 from the AC power supply 116, while transmitting to all (8) wireless UWB receivers 131-138 in addressable loudspeakers 121-128. A power supply 116 is coupled to each of the loudspeakers 121-128, including the subwoofer 128, so that power for the speakers 121-128 is now inside each speaker 121-128, thus obtaining energy to drive the internal amplifiers. Each speaker has its own A/C converting power module (not shown), which may be customized.

Figure 3:
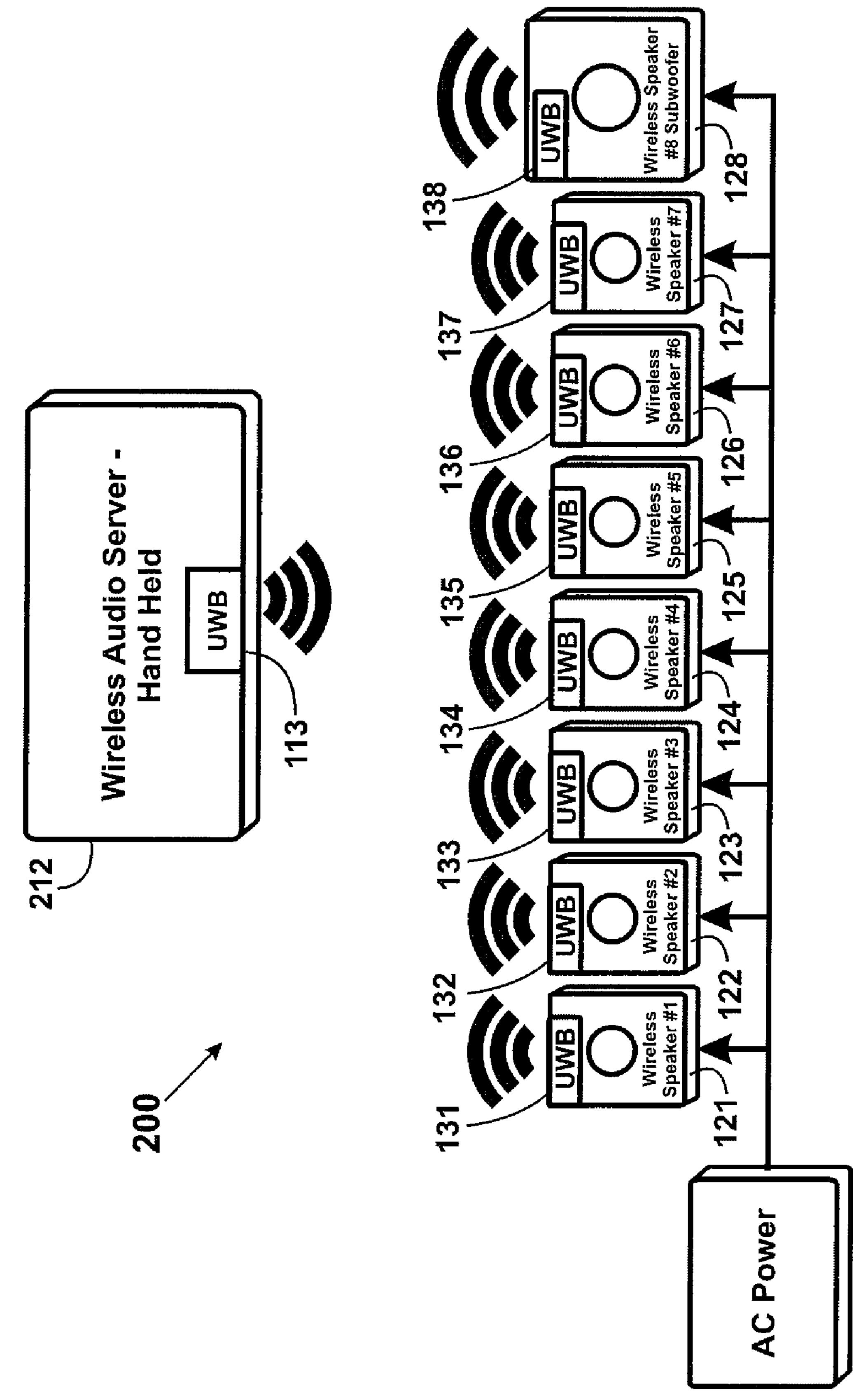
FIG. 3 is a block diagram of a second embodiment of a multiple-speaker audio system according to the invention with loudspeakers surrounding the listening space.

FIG. 3 shows a further embodiment the audio system 200 of the present invention wherein a portable or handheld wireless audio server 212 (e.g., powered by batteries) is employed. The wireless audio server 212 has a built-in UWB or similar short-range transmitter UWB 113 transmitting to all (8) wireless UW or similar receivers 131-138 in addressable loudspeakers 121-128. The power supply 116 is coupled to the loudspeakers 121-128, including the subwoofer 128, for the internal amplifiers.

This configuration has many advantages over the current architecture. Some of these advantages are:

1. The table-top audio amplifier is completely eliminated.
2. The table-top Audio/Video (A/V) receiver is completely eliminated.
3. All external speaker wires are completely eliminated.
4. All external cables between audio amplifier and A/V receiver are completely eliminated.
5. The Audio Server 212 is completely mobile. It can be taken to other rooms inside a house and instantly connected to speakers in that room. It can be carried by the user and used as a standalone device with earphones, albeit without the benefits of more than two channels of sound. In this way, a single Audio Server 212 is sufficient for an entire location, which may have many sets of audio speakers.

Properly configured, the overall cost of the audio system is reduced while the quality of audio and increasing the end-user flexibility and satisfaction is improved. As an extension of the wireless architecture and this unique technology, using an Ultra Wide Band Radio allows for, under appropriate circumstances, up to 128 speaker surround sound.

Figure 4:
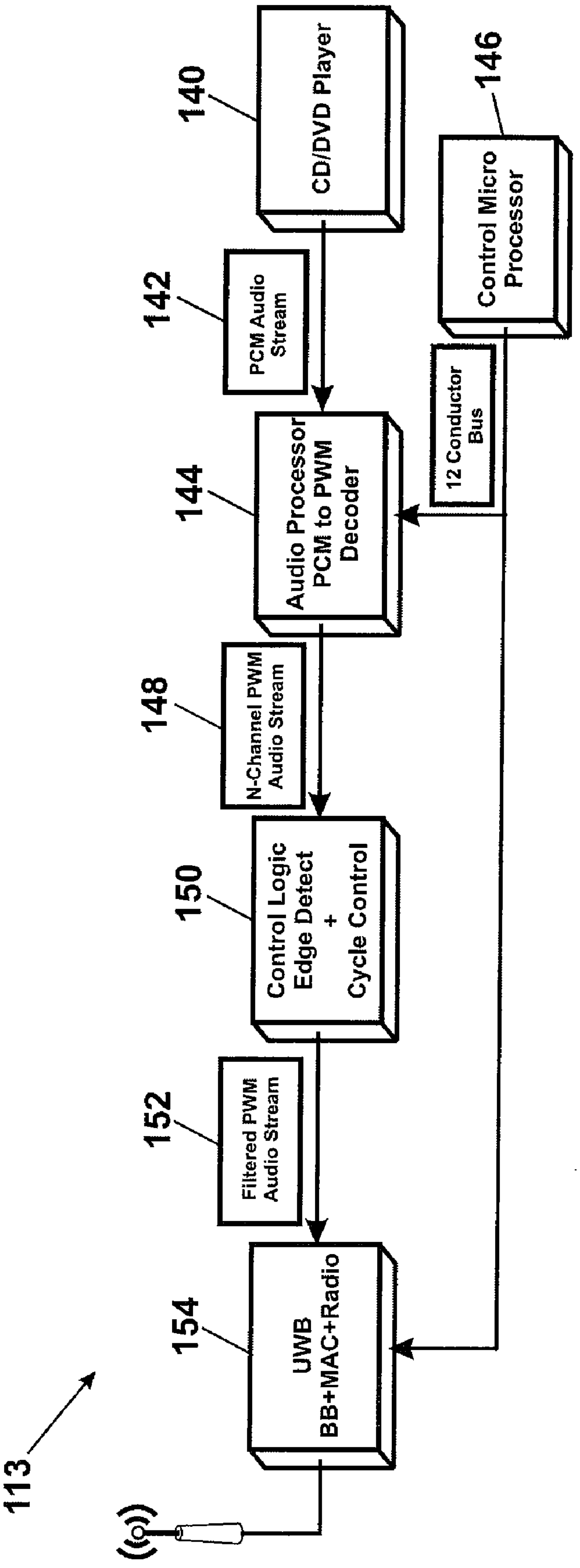
FIG. 4 is a block diagram of an audio transmitter section according to the invention.
Figure 5:
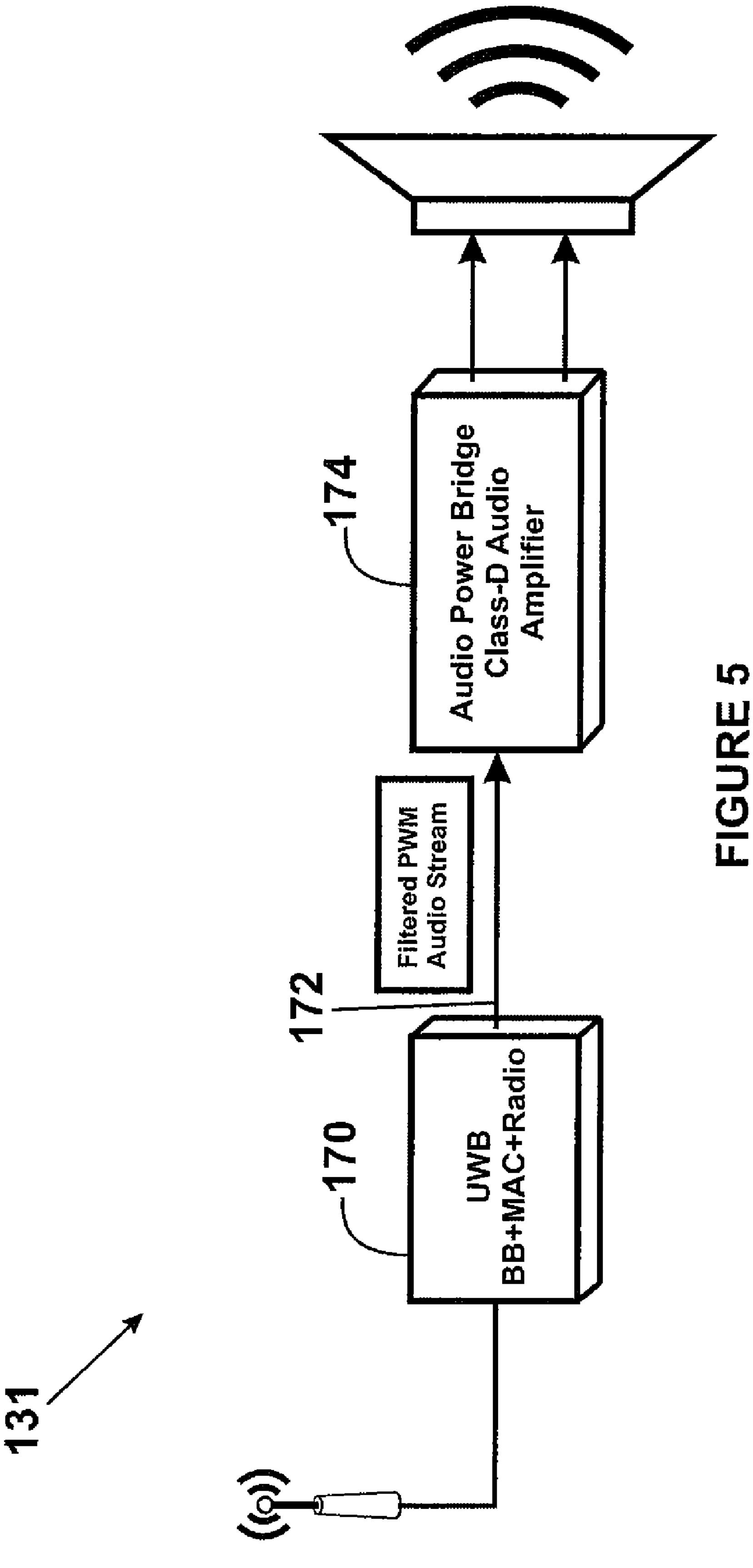
FIG. 5 is a block diagram of an audio receiver section according to the invention.

FIGS. 4 and 5 show in block diagram form a wireless audio transmitter section 113 and receiver section 131 of a system 100, 200 according to the invention. In a typical embodiment of the wireless audio system 100, 200, the transmitter section 113 is inside an audio server, such as a CD player, DVD player, digital player such as an Apple iPod or MP3 player, even a mobile phone/PDA combination. The receiver section 131 is disposed inside a speaker 121 or even a wireless headphone (not shown). The receivers 131 etc. are slaved to the transmitter 113 and do only a minimal level of audio decoding in order to reproduce the intended audio output of their associated speaker.

The transmitter 113 includes or is coupled to an audio player 140, such as a CD/DVD player or MP3 player, which serve as the storage media on which the music or audio program is stored in digitally encoded form or even analog audio form. The digital form is reproduced typically as a Pulse Code Modulation (PCM) audio stream 142, but there are many different formats in which the audio may be encoded. The audio stream 142 is supplied to an audio processor PCM to PWM (pulse width modulation) decoder 144, which outputs, under supervision of a control microprocessor 146, a multi-channel PWM audio stream 148 for further processing. The audio processor PCM to PWM decoder 144 is ideally a semiconductor chip that decodes the audio stream 142 supplied from the storage media 140. It may be a microprocessor or a digital signal processor (DSP), with special decoding firmware/software for the decoding scheme. For example, if the audio stream is encoded in DTS format, then the decoder 144 needs the codes necessary to decode the DTS format and then it re-encodes it in the multi-channel PWM audio stream 148.

The N-channel PWM audio stream 148 is sent from the decoder 144 to a control logic subsystem 150, ideally a special semiconductor chip. This chip 150 is operative to detect changes in the PWM audio stream, whereupon it latches the data if there is a change, outputs a filtered PWM audio stream 152 and runs cycles to a UWB transmitter subsystem 154 so that the audio data can be sent out on the air immediately.

Figure 6:
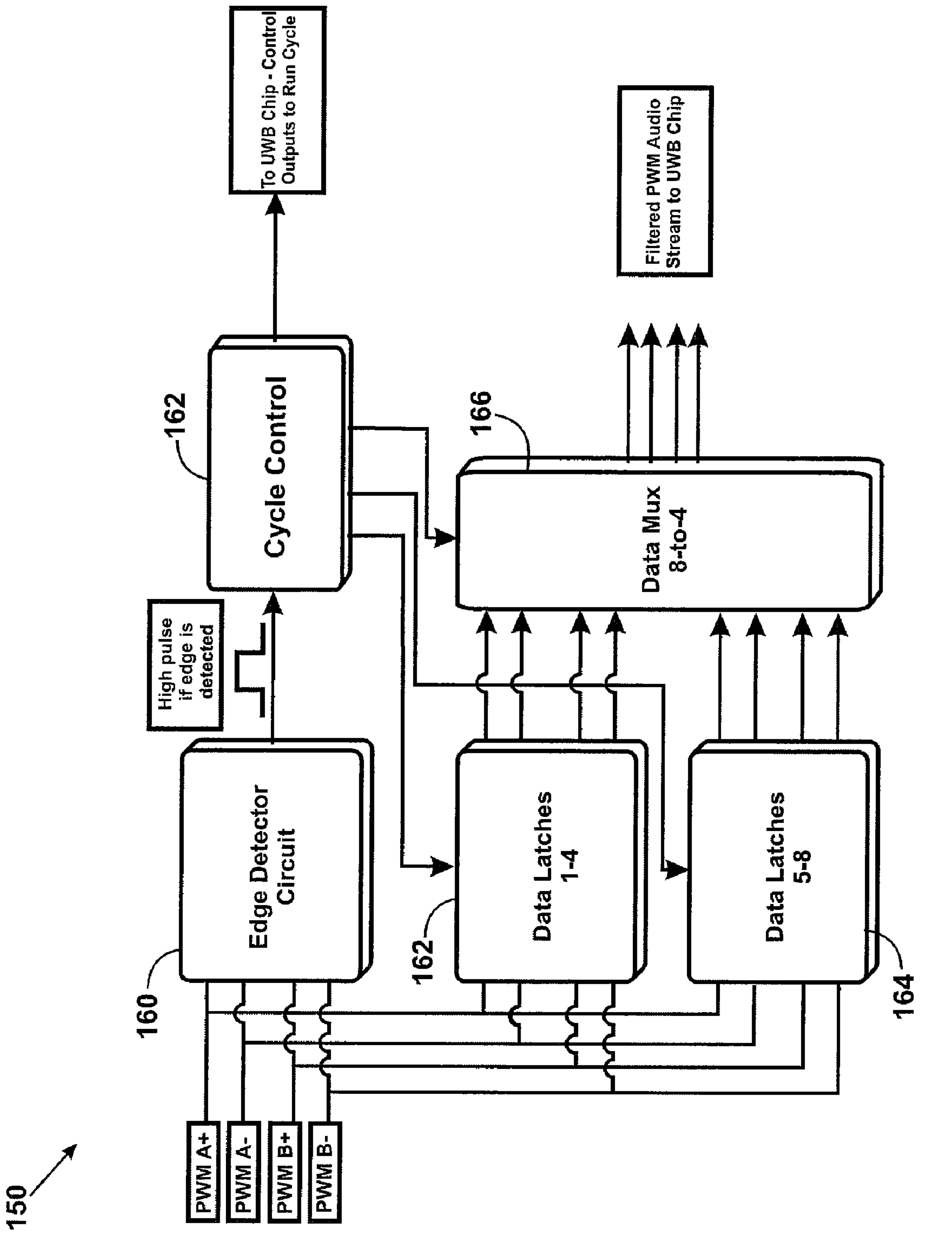
FIG. 6 is a block diagram of an audio transmitter control logic subsystem according to the invention.

FIG. 6 is a block diagram of the audio transmitter control logic 150 of the invention. In this example, stereo (two-channel) audio is illustrated, although the extension to eight or more channels is straightforward based on these principles. The control logic 150 includes an edge detector circuit 160, a cycle control module 162, data latches 164, 166 in typical groups of redundant pairs, and a data multiplexer 166.

If there is any change in any of the PWM audio channels (rising or falling edge), the data will be latched inside this control chip 150 and sent to the UWM chip 154 for immediate wireless transport to the speakers. In this manner, only changes in the PWM signals are sent. If there are no changes, nothing is sent. All the PWM channels latch simultaneously, and all the PWM signals are sent simultaneously to all the speakers. However, in the event one set of data latches 1-4 162 is occupied servicing a transmit cycle while PWM changes are occurring, the other set of data latches 164 is used to capture the change. After the first transfer is finished, a second data transfer to the UWB chip 154 is performed, transferring the data from latches 5-8. This way no data is lost. After this transfer is finished, the controller reverts back to transferring data from latches 1-4.

This control chip 150 works on rising and falling PWM edges from the decoder 144. It does not use any form of sampling. It is therefore much faster and much more efficient than sampling techniques, and is also much more accurate.

In operation, the design PWM pulse length in the UWB receiver 131 (FIG. 5) inside the speaker 121 should exactly match the PWM pulse length from the decoder chip 144 inside the transmitter. Otherwise the sound quality is affected. In addition, there should be minimum delay or offset to allow for speaker phase matching and synchronization.

The receiver of FIG. 4 is described as if a 7.1 surround sound system (8 speakers in 8 channels) is employed. The description is readily generalized to more or fewer channels. Upon initial setup, each receiver 131-138 (speaker 121-128) is assigned a number from 1 to 8. These numbers can be sent wireless to initialize each of the receivers 131-138 with a unique assignment code. These numbers or equivalent assignment codes are each then stored in non-volatile memory within each receiver. When the transmitter 113 on behalf of the audio server 112,212 sends the receiver 131 actual audio programming such as music, the individual receivers, being only interested in information related to the bit number that was assigned to it, ignores all other bits. The addressed receiver 131 using its receiving logic UWB chip 170, filters out the bits of non-interest, captures the bit of interest and immediately send it to its output port 172. This bit then goes to the power amplifier section 174. If the bit has not changed, nothing will happen. If the bit has changed, the power amplifier 174, typically a Class-D digital amplifier adapted to respond to bit-level changes, reacts accordingly. In this way, each receiver 131 only does minimal decoding and thus does not require a powerful processor. A rudimentary processor within the UWB chip 170 can easily perform this function. No external processor or complicated logic is needed, a noteworthy and inventive simplification and cost savings. This also reduces the overall system cost, since there are many simple receivers in the system, yet only one transmitter. As long as there is a reliable wireless connection between the transmitter and the receiver, audio and music quality is not compromised.

Delays are needed to assure synchronized audio output from the speakers. The receivers 131 may each receive a packet of audio data at the rate that the transmitter sees fit to send it. The receiver itself does not care how fast (or slow) the audio data is sent to it. The receiver simply gets the data when it is sent and outputs this bit to its port 172. Better audio quality can be achieved, however, if the transmitter 113 sends audio data at a higher rate. The data rate determines the granularity of the possible audio changes, such as dynamic range, audio spectrum and the like. Faster data rates translate into finer granularity. As an example, the transmitter may send the audio data at 384 Kbps to each speaker. The data rate 384 Kbps translates into an allocation of 2.60 milliseconds per bit at each speaker. Thus the individual receivers normally are able to output data changes to its power section no faster than every 2.60 milliseconds. This does not mean the receiver output is always changing every 2.60 milliseconds, only that this is the fastest possible rate at which it can change. The average rate of change is actually much lower and depends heavily on the nature of the audio program. In addition, since bits are not set simultaneously at each speaker for instantaneous reproduction, it is necessary that a delay of at least one clock cycle be built in at the receivers to assure that each speaker responds in synchronism with all speakers in the system.

Bit Mapping is used to implement the invention. FIG. 7 is a chart illustrating the bit mapping that can be used for the PWM payload transmitted to the receivers. This illustrates bit mapping for 7.1 Surround Sound. In 8-Speaker (7.1) Surround Sound, the following applies:

Maximum number of speakers in system is 8.

Can be any number of speakers from 1 to 8. Includes stereo, 2.1SS, 5.1SS, 7.1SS.

8 DPWM bits can be sent to all receivers/speakers simultaneously, allowing the receivers to filter out the bits not addressed to it.

Each bit is mapped to a single receiver/speaker.

Each receiver only looks at its own bit for changes.

If no changes, then the receiver outputs nothing.

If there is change in its own bit, then a receiver outputs this change to its port connected to the speaker amplifier.

Timing for decode of any bit in stream is exactly the same. It doesn't matter where the bit is in the stream, the time to output the bit is exactly the same. This way speakers are always in sync with each other.

Receivers and speakers may be redundant. More than one receiver can receive the same bit and output identical sound with another.

A maximum 128-Speaker Surround Sound is within the contemplation of the invention, where the maximum number of unique receivers and associated transmitters in a system is 128. In fact, there can be any number of speakers from 1 to 128, including stereo, 2.1SS, 5.1SS, 7.1SS, etc. With a 128 bit long word, properly encoded, 128 DPWM bits can be sent so as to be received at all amplifiers of all speakers simultaneously, with each bit mapped to a speaker. Timing for decode of any bit in stream is exactly the same. It doesn't matter where the bit is in the stream, the time to output the bit is exactly the same. Thus speakers are always in synchronism with each other.

The invention has been explained with reference to specific embodiments. Other embodiments will be evident to those of ordinary skill in the art. Therefore it is not intended that this invention be limited, except as indicated by the appended claims.

What is claimed is:

1. A multiple channel wireless audio system comprising:

a single wireless transmitter operative to transmit a plurality of N-bit words to a plurality of digital audio receivers, said plurality of N-bit words being representative of audio; and a plurality of wireless digital audio receivers, each digital audio receiver comprising an audio amplifier, each digital audio receiver having a corresponding bit position in each N-bit word, each digital audio receiver configured to provide a bit value only from said corresponding bit position of each received N-bit word to said audio amplifier, each audio amplifier configured to generate output in response to said provided bit value.

2. The wireless audio system according to claim 1 wherein said transmitter comprises a modulator operative to transmit a multiplexed multiple-channel pulse width modulated audio stream via ultra wide band transmission.

3. The wireless audio system according to claim 2 wherein said transmitter further includes an audio processor operative to convert an audio stream to multiple-channel pulse width modulation.

4. The wireless audio system according to claim 3 further including control logic for multiplexing said multiple-channel pulse width modulation into said multiplexed multiple-channel pulse width modulated audio stream operative to address individual ones of said digital audio receivers.

5. The wireless audio system according to claim 4 wherein said control logic includes a set of primary digital latches and redundant secondary digital latches, said secondary digital latches being operative to capture said multiple-channel pulse width modulated audio stream whenever said primary digital latches are busy and unable to accept input.

6. The wireless audio system according to claim 4 wherein each said digital audio receiver includes an associated digital audio amplifier and associated sound output element, and wherein each said digital audio receiver is operative to recognize a bit addressed to it and to convey said bit directly to said digital audio amplifier only if different from an immediately prior bit addressed thereto.

7. An addressable wireless digital audio receiver module for a multiple channel digital audio system having a wireless transmitter for conveying pulse width modulated audio data, for use with a digital audio amplifier associated with each speaker in said audio system, said receiver comprising:

circuitry to receive a plurality of N-bit words in said pulse width modulated audio data; and digital logic operative to recognize a predetermined bit position in each received N-bit word and operative to supply a bit value only from said predetermined bit position of said each received N-bit word to said audio amplifier only if different from a bit value from an immediately prior received N-bit word.

8. A multiple channel wireless audio transmitter for a wireless audio system comprising:

a modulator operative to produce pulse width modulated audio data;

a wireless transmitter section operative to transmit said pulse width modulated audio data via ultra wide band transmission to a plurality of N uniquely addressable digital audio receivers, wherein said stream comprises a plurality of N-bit words, wherein each bit position in each N-bit word corresponds to one and only one of said addressable digital audio receivers.

9. The wireless audio transmitter according to claim 8 further including an audio processor operative to convert an audio stream to multiple-channel pulse width modulation.

10. The wireless audio transmitter according to claim 8 further including control logic for multiplexing said multiple-channel pulse width modulation into said pulse width modulated audio data operative to address individual ones of said digital audio receivers.

11. The wireless audio transmitter according to claim 9 wherein said control logic includes a set of primary digital latches and redundant secondary digital latches, said secondary digital latches being operative to capture said pulse width modulated audio data whenever said primary digital latches are busy and unable to accept input.

12. An addressable wireless digital audio receiver module for a multiple channel digital audio system having a wireless transmitter for conveying pulse width modulated audio data operative to address said addressable receiver, comprising:

circuitry to receive a plurality of N-bit words in said pulse width modulated audio data;

digital logic operative to recognize a predetermined bit position in each received N-bit word and operative to supply a bit value only from said predetermined bit position of said each received N-bit word to an audio amplifier only if different from a bit value in an immediately prior received N-bit word; and a digital audio amplifier for coupling an individual one of each speaker in said audio system.

13. An addressable wireless digital audio receiver module according to claim 12 wherein said speaker includes an associated sound output element adapted to be coupled to said digital audio amplifier, and wherein said digital audio receiver is operative to recognize a bit addressed to it and to convey said bit to directly said digital audio amplifier only if different from an immediately prior bit addressed thereto.

14. A method for transporting multiple channel wireless audio comprising:

transmitting a plurality of N-bit words representative of audio to a plurality of uniquely addressable digital audio receivers;

receiving at a plurality of receivers, each associated with a single speaker, said plurality of N-bit words;

identifying at each said receiver a bit position in each N-bit word that corresponds to said each receiver; and supplying a bit value only from said bit position to an audio amplifier associated with said receiver.

15. The wireless audio method according to claim 14 further comprising modulating said audio as a multiplexed multiple-channel pulse width modulated audio stream; and transmitting said multiplexed multiple-channel pulse width modulated audio stream via ultra wide band transmission.

16. The wireless audio method according to claim 15 comprising converting an audio stream to multiple-channel pulse width modulation.

17. The wireless audio method according to claim 16 further comprising multiplexing said multiple-channel pulse width modulation into said multiplexed multiple-channel pulse width modulated audio stream operative to address individual ones of said digital audio receivers.

18. The wireless audio method according to claim 16 further comprising invoking a set of primary digital latches and redundant secondary digital latches, said secondary digital latches capturing said multiple-channel pulse width modulated audio stream whenever said primary digital latches are busy and unable to accept input.

19. The wireless audio method according to claim 18 wherein each said digital audio receiver includes an associated digital audio amplifier and associated sound output element, further comprising said digital audio receiver recognizing at said digital audio receiver a bit addressed to it and conveying said bit directly to said digital audio amplifier only if different from an immediately prior bit addressed thereto.

20. An addressable wireless digital audio receiving method for a multiple channel digital audio system having a wireless transmitter for conveying pulse width modulated audio data operative to address said addressable receiver, for use with a digital audio amplifier associated with each speaker in said audio system, said method comprising:

receiving a stream of N-bit words in said pulse width modulated audio data;

obtaining a bit value stored in a bit position in each received N-bit word that corresponds to said and only said receiver and supplying said bit to said audio amplifier only if different from a bit in an immediately prior received N-bit word.

* * * * *